United States Patent
Hanumara et al.

(10) Patent No.: US 9,183,561 B2
(45) Date of Patent: Nov. 10, 2015

(54) AUTOMATIC GENERATION OF TREND CHARTS

(75) Inventors: Poornima Hanumara, Boise, ID (US); David Sherman, Boise, ID (US); Wade Dorrell, Boise, ID (US); Elaine Andersen, Boise, ID (US); Julius Ravago, Eagle, ID (US); Robert Kaiser, Boise, ID (US)

(73) Assignee: Microsoft Technology Licensing, LLC, Redmond, WA (US)

(*) Notice: Subject to any disclaimer, the term of this patent is extended or adjusted under 35 U.S.C. 154(b) by 668 days.

(21) Appl. No.: 13/206,614

(22) Filed: Aug. 10, 2011

(65) Prior Publication Data

US 2013/0038612 A1    Feb. 14, 2013

(51) Int. Cl.
*G06T 11/20* (2006.01)
*G06Q 30/02* (2012.01)
*G06F 17/24* (2006.01)

(52) U.S. Cl.
CPC .............. *G06Q 30/02* (2013.01); *G06F 17/245* (2013.01)

(58) Field of Classification Search
CPC ............................ G06T 11/206; G06F 3/0481
USPC ............................................................ 345/440
See application file for complete search history.

(56) References Cited

U.S. PATENT DOCUMENTS

| | | | |
|---|---|---|---|
| 5,414,809 A | 5/1995 | Hogan et al. | |
| 6,577,304 B1 | 6/2003 | Yablonski et al. | |
| 6,801,201 B2 | 10/2004 | Escher | |
| 7,023,440 B1 * | 4/2006 | Havekost et al. | 345/440 |
| 7,574,665 B2 | 8/2009 | Cortright | |
| 2008/0065626 A1 * | 3/2008 | Jain et al. | 707/5 |
| 2008/0114625 A1 | 5/2008 | Kline et al. | |
| 2009/0006466 A1 * | 1/2009 | Ellis et al. | 707/103 R |
| 2010/0169759 A1 * | 7/2010 | Le Brazidec et al. | 715/219 |
| 2010/0318891 A1 * | 12/2010 | Lo et al. | 715/214 |

OTHER PUBLICATIONS

Rick Barnes, James Andrew, Stephen Buck, and so on, "OpenOffice.Org 3.3 Calc Guide", Publish Apr. 18, 2011.*
John Walkenbach, "John Walkenbach's Favorite Excel 2007 Tips and Tricks", Jun. 2007.*

(Continued)

*Primary Examiner* — Devona Faulk
*Assistant Examiner* — Jin Ge
(74) *Attorney, Agent, or Firm* — Tom Wong; Jim Ross; Micky Minhas

(57) ABSTRACT

Automatic trend analysis is provided on a dataset. Upon selection of a data cell or chart point within a data representation, a trend chart is automatically generated in order to demonstrate how the data within the selection trends over time. The system may automatically configure the trend chart based on the metadata of a data source associated with a selected data such that no input or configuration is needed by a user. The system may identify the time hierarchies and other data attributes included in the metadata of the data source associated with a selected data cell and may automatically configure the axis settings and the trend lines according to metadata of the data source. The trend chart may also be configured to display multiple trend lines for comparing multiple data set trends over a specified time period.

20 Claims, 7 Drawing Sheets

(56) References Cited

OTHER PUBLICATIONS

Igarashi, et al., "Fluid visualization of spreadsheet structures", Retrieved at <<http://www2.parc.com/istl/projects/fluid/fluid-spread-vl98.pdf>>, IEEE Symposium on Visual Languages, 1998, Sep. 1-4, 1998, pp. 8.

Green, et al., "Auto Brief: an experimental system for the automatic generation of briefings in integrated text and information graphics", Retrieved at <<http://citeseerx.ist.psu.edu/viewdoc/download?doi=10.1.1.154.8427&rep=rep1&type=pdf>>, International Journal of Human-Computer Studies, vol. 61, Jul. 1, 2004, pp. 32-70.

"Search Report Issued in European Patent Application No. 12822279.1", Mailed Date: Feb. 6, 2015, 5 Pages.

Antonovich, Michael P., Chapter 8: Publishing Excel with Excel Services, In Book: Office and SharePoint 2010 User's Guide Integrating SharePoint with Excel, Outlook, Access and Word, Jun. 29, 2010, 3 Pages.

Biafore, Bonnie, "Microsoft Project 2010: The Missing Manual", A O'Reilly Media Publication, Jun. 30, 2010, pp. 462-466.

\* cited by examiner

AUTOMATIC GENERATION OF TREND CHARTS

BACKGROUND

Spreadsheet applications, database applications, and other similar data reporting applications may be used for collecting and displaying data, and the data may be collected and displayed in a variety of data representation methods, including data summarization tables, charts, graphs and other data reporting tables. Data representations may contain a multi-dimensional data set or data source in which the dataset is defined by multiple values and/or data attributes. Trend analysis is a commonly used analysis technique for analyzing the data contained in a data representation in order to determine how particular data trends over time. Trend analysis may provide insight into how a particular set of data has performed in the past and how it may be expected to perform in the future.

In existing data representations such as data summarization tables, generating a trend chart for performing trend analysis can be a cumbersome and complicated process. Manually generating a trend chart for trend analysis may require a user to be proficient in multidimensional data sources and advanced data representation techniques in order to structure a data summarization table to generate a trend chart. A user needs to be further familiar with how to restructure the dataset query and apply appropriate filters to configure the dataset and generate a trend chart for the dataset. Trend analysis of data may be under-utilized since only advanced users may be able to generate and configure complicated trend charts for analyzing datasets.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing a trend chart in order to perform trend analysis on a dataset. A system according to embodiments may recognize a user selection of a data cell within a data representation, such as a data summarization table or even a chart; and upon the selection of the data cell, a trend chart may be automatically generated in order to demonstrate how the data within the selected data cell trends over time or another parameter. The system may automatically configure the trend chart based on the metadata of the data source associated with a selected data cell such that no input or configuration may be needed from a user. The system may identify time hierarchies and/or other data attributes included in the metadata of the data source associated with the selected data cell and may automatically configure axis settings and trend lines according to identified time hierarchies and other data attributes from the data source. The trend chart may be configured to display multiple trend lines for comparing multiple data set trends over a specified time period.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
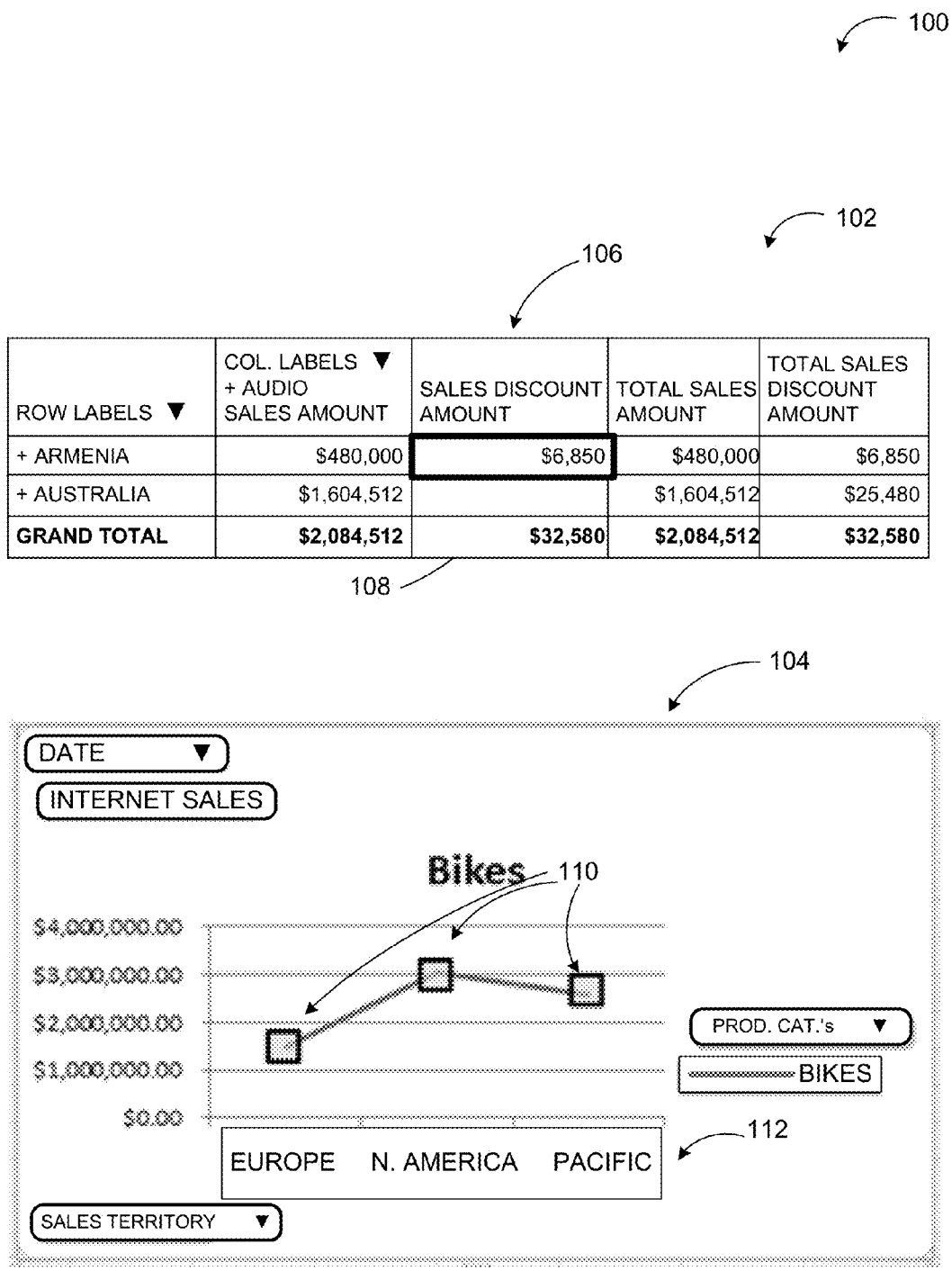
FIG. 1 illustrates an example screen shot of a data summarization table and a data representation chart.

As briefly described above, an automatically generated trend chart may be provided in order to enable a user to perform trend analysis on a dataset. The system may enable a user to select a data cell in a data representation for generating a trend chart, and the trend chart may be automatically generated in order to demonstrate how the data within the selected data cell trends over time. The system may automatically configure the trend chart and trend line settings based on the data source associated with the selected data cell, such that no manual configuration of the trend chart may be needed by the user.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for providing data representations in forms of tables, charts, and comparable displays. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 illustrates an example screen shot of a data summarization table and a data representation chart. As illustrated in diagram 100, data may be collected and displayed in a variety of data representation methods, including for example, a data summarization table, a chart, a graph etc. Typically, data representations may be created using a spreadsheet or similar application for collecting, organizing, and displaying data in a selected data representation. Once created in a spreadsheet application, the data representation may be displayed in any application that supports connecting to the data set for the data representation, including for example displaying a chart in a presentation application and displaying a table or graph in a word processing application.

A data representation such as a data summarization table may include a multi-dimensional data set or data source in which the dataset is defined by multiple values or characteristics, such as for example, number of units sold, regions where sold, and date sold. Trend analysis is a common analysis technique for analyzing the data in a data summarization table in order to determine how particular data trends over time. However, in existing data representations such as data summarization tables, generating a trend chart for performing trend analysis can be cumbersome and inefficient. Manually generating a trend chart for trend analysis may require a user to be proficient in multidimensional data sources and advanced data representation techniques in order to structure a data summarization table to generate a trend chart. A user may further have to be familiar with how to restructure the dataset query and apply appropriate filters to configure the dataset and generate a trend chart for the dataset. Automatically generating a trend chart may enable users with little experience in multidimensional data sources or data representations to perform trend analysis of a data set without having to perform a complicated number of steps to generate the trend chart.

In a system according to embodiments, for a user to generate a trend chart in order to perform trend analysis on a dataset, the user may simply need to have access to a data summarization table 102, chart 104, or other data representation. The user may select a data point from a data summarization table 102, and the system may automatically configure the time fields and values to generate a trend chart demonstrating how the data is trending over time. For example, from an existing data summarization table 102 or chart 104, the user may select a number on which the user wants to perform trend analysis, and if the cell has been determined to support trend analysis 106 (i.e., other values across time line can be determined to generate a trend line), the system may automatically generate a trend chart for that selected cell. A cell may support trend analysis 106 when the data source behind the cell includes a time dimension in the data source's metadata. If the cell does not support trend analysis, a trend chart may not be generated for the selected cell.

In a system according to embodiments, when the user selects the cell, the system may recognize the selected cell as an active cell 108 and may automatically identify the multi-dimensional data source behind the active cell 108. Likewise, a user may select a data point 110 on a chart 104, and the system may recognize the selected data point 110 as an active data point and may identify the data source or data cell to which the data point corresponds in a data set. Upon selection of the active cell 108 or active data point 110, the system may be configured to identify a time hierarchy associated with the selected active cell 108 or active data point 110 and may automatically generate a trend chart displaying the trend of the data over time. The trend chart may be displayed on the same page as the original data summarization table, or in another embodiment, the trend chart may be displayed through a new user interface or another page in the document.

Figure 2:
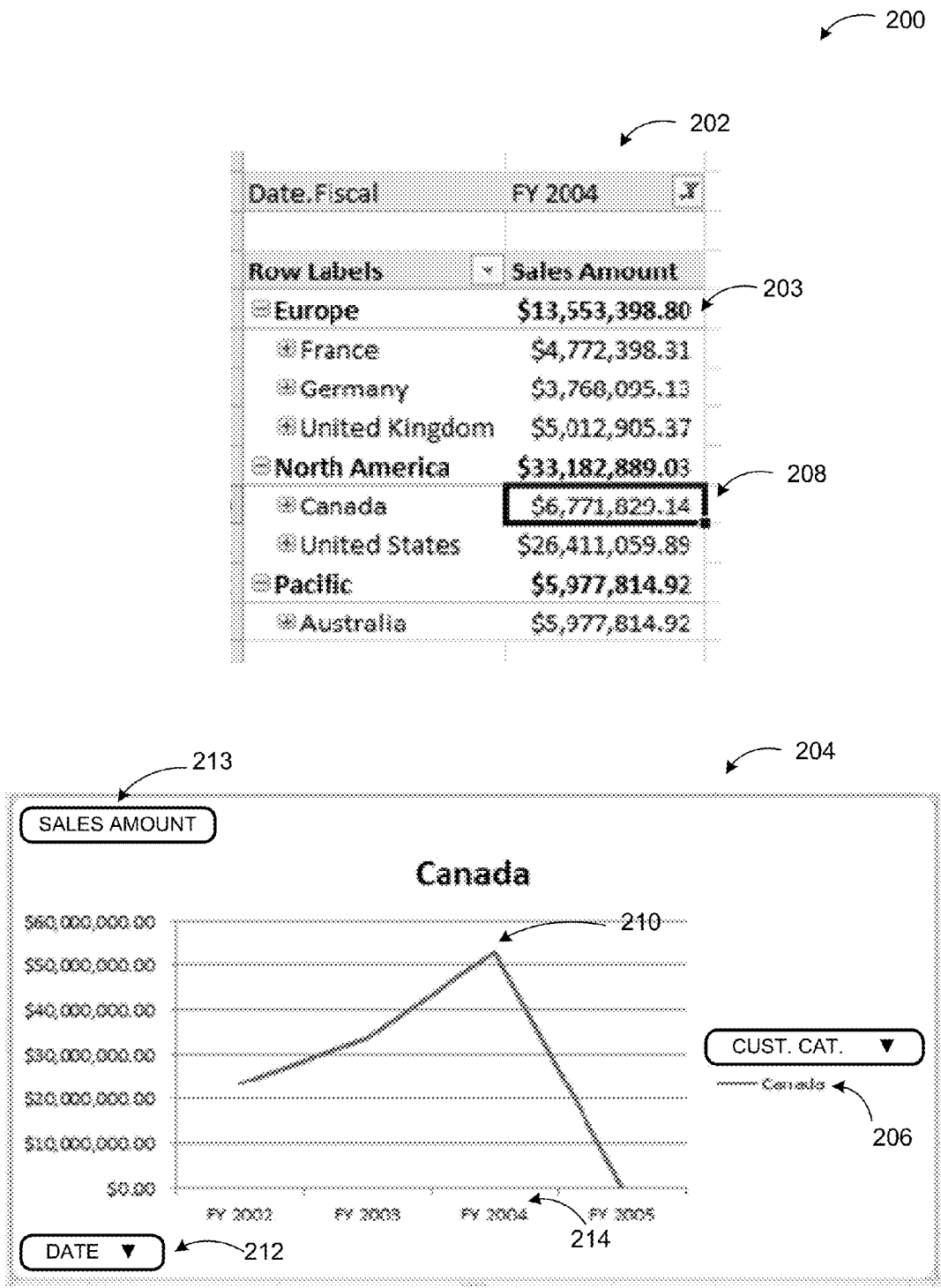
FIG. 2 illustrates an example for automatically generation of a trend chart from a data summarization table.

FIG. 2 illustrates an example automatically generated trend chart from a data summarization table according to embodiments. As briefly described above in conjunction with FIG. 1, when a user selects an active cell in a data summarization table 202, a trend chart 204 may be automatically generated based on the multidimensional data source associated with the active cell 208. In a system according to embodiments, the system may identify the context of the active cell 208 and the metadata included in the data source behind the active cell 208. If a time dimension is included in the data source for the active cell 208, then the active cell may be determined to support trend analysis, and a trend chart 204 may be automatically generated for the selected active cell 208.

According to some embodiments, the system may identify the context of the active cell 208, including the data attributes and fields associated with the active cell 208 in order to generate the trend chart 204. For example, the system may identify the rows, columns, filters, and slicers associated with the active cell in the data summarization table for determining the appropriate fields and values to display in the trend chart. In an example embodiment, the system may identify the measure 203 or value of the currently selected active cell 208, and the identified measure 203 may be configured as the vertical axis value 213 on the trend chart 204 to display how that value trends over time.

In a system according to embodiments, a time hierarchy 214 for the trend chart 204 may be automatically selected based on the data source for the selected active cell 208. In a scenario where the time hierarchy is displayed as a field or filter on the original data summarization table 202, the system may automatically select the displayed time hierarchy and may configure the trend chart 204 to use the selected time hierarchy 214 as the horizontal axis for the trend chart 204. Optionally, the system may expand the time hierarchy by a level to display a larger time period range on the trend chart 204.

In another scenario according to embodiments, the time hierarchy may be left out in the current view of the original data summarization table 202, however the data source behind the selected active cell 208 in the data summarization table 202 may include the time hierarchy data. The system may automatically identify the time hierarchy data in the metadata available for the data source and may select the appropriate time hierarchy 214 for displaying on the trend chart 204. In an example embodiment, the system may select the largest available time hierarchy for the selected active cell 208. For example, the data source for the active cell may contain sales data for a particular country every week, month, and year for five years. In such a scenario, the system may select to display a trend line 210 on the trend chart 204 for the sales in the selected country over the largest time hierarchy available, or five years.

According to some embodiments, the system may be further configured to ensure that enough data points are available for a selected time hierarchy associated with the active cell 208 to generate a useful trend line 210 on the trend chart 204. The system may determine the time hierarchy level to display based on the number of data points available for a particular time hierarchy. For example, the system may need a minimum of at least three data points be available for a selected time hierarchy. If at least three data points are not available for a selected time hierarchy level, then the selected time hierarchy level may be reduced to the next highest level in order to ensure there are enough data points available to generate a useful trend line on the trend chart. In an example scenario, if only two years of data is available in a particular data source for the active cell 208, the system may select a time hierarchy level of half-years or quarters so that more data points are available for a particular set of data to produce the trend line 210 on the trend chart 204. In a system according to embodiments, the default minimum number of data points for generating a trend line on a trend chart may be three data points. However, the user may customize the settings to employ more data points for generating the trend chart for the active cell 208.

In a system according to embodiments, the time hierarchy may be automatically determined and configured for the trend chart 204, and in a further embodiment, after automatically generating the trend chart 204 for the selected active cell 208, a user may subsequently customize the trend chart 204 to further refine the trend chart 204 for their needs. For example, the user may select a different time hierarchy on the horizontal axis for the trend line 210, or the user may select a different field of data to show its trend over time.

The functionality and controls for customizing the axes and for selecting the time hierarchies for the trend chart 204 may be provided on the chart itself, or in other parts of the user interface such as a menu bar, toolbar, and drop down menu. Additional formatting functionality and user options may be provided in the trend chart so that a user can customize the trend chart settings, format, layout and preferences after the trend chart has been automatically generated for the selected active cell. For example, a user may specify the type of trend line that may be displayed, such as showing high points, low points, or a mean line. Additionally, a user may be able to adjust the labels 213 and legends 206 on the trend sheet in order to customize the trend chart according to the user preferences.

In another example embodiment, the system may be configured to identify an intersection between two time hierarchies. In an example scenario, a time hierarchy such as calendar year 2002 may be the identified time hierarchy for the selected active cell 208 in the data summarization table 202. A user may desire to view the data for the active cell 208 as it trends over the fiscal year 2002, rather than the calendar year 2002. The system may be configured to enable the user to select the fiscal year for displaying in the trend chart. The system may automatically determine the intersection between the fiscal year and the calendar year for the selected active cell 208, and may reconfigure the data query for the active cell 208 such that the trend chart 204 may display the trend line 210 for fiscal year data rather than the calendar year data.

In another example embodiment, the system may be configured to fill empty cells or time gaps when they are detected in a data source associated with the active cell. In an example scenario, a user may select noncontiguous time periods for generating a trend chart, such as year 2000 and 2004. The system may identify a time gap for years 2001-2003 and may fill in the time period gap with the data for those time periods when automatically generating the trend chart 204. In another example embodiment, data may not be available for a time period within the selected time hierarchy. The system may be configured to display a gap in the trend line 210 at the corresponding data point where the data is missing. Alternatively, the system may be configured to show a zero value in the trend line 210 at the corresponding data point where the data is missing, or the system may ignore the missing data and may connect the data points with the trend line 210. Alternatively, a break may be displayed in the trend line.

While time dimension is used as an example for automatically generating trend charts, other parameters may also be used in other embodiments. For example, sales figures may be trended against production costs, profits, or comparable values. Thus, trend charts may be generated based on available dimension in a data source associated with an active cell and not be limited to time dimension.

Figure 3:
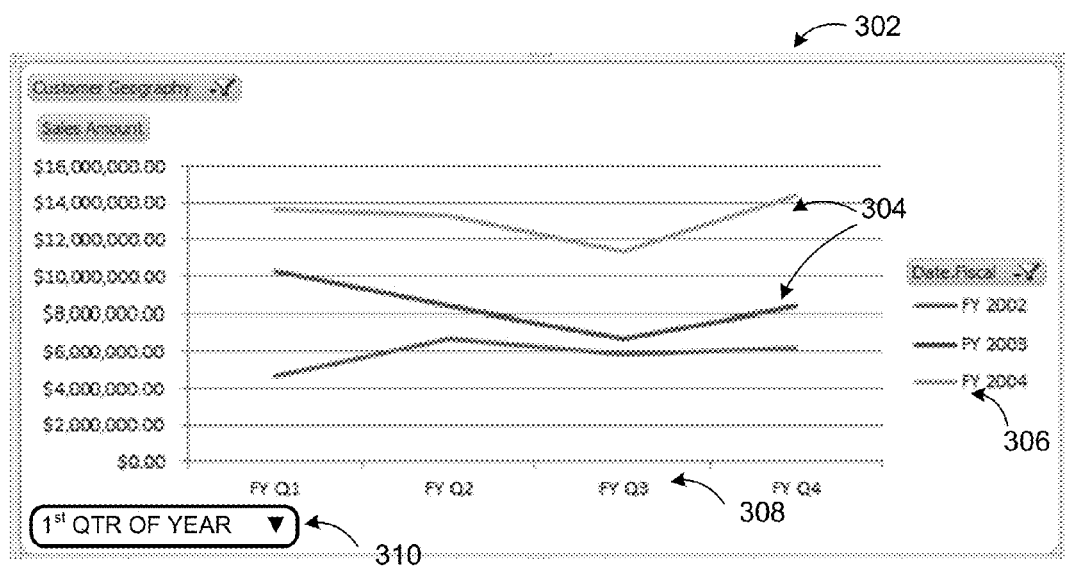
FIG. 3 illustrates an example of an automatically generated comparative trend chart according to some embodiments.

FIG. 3 illustrates an example of automatically generated comparative trend chart according to embodiments. As described in conjunction with FIG. 2, a trend chart may be generated for a selected active cell and a time hierarchy for the trend chart may be automatically selected based on the data source associated with the selected active cell. In a system according to embodiments, the system may automatically generate a time-folded trend chart 302, such that the time hierarchy 308 may be condensed into series, in order to show seasonal patterns in a data trend. For example, as demonstrated in diagram 300 the time-folded trend chart 302 displays the seasonality over quarters for the fiscal years 2002, 2003, and 2004 306. The time-folded trend chart 302 may enable a user to see how different years compare over quarters for specific data criteria.

In order to generate the time-folded trend chart 302 when an active cell is selected, an example system may identify two time hierarchies associated with the active cell that complement each other in type, dimension, level type, etc., such as for example, a year and a quarter-year. The system may automatically select one of the time hierarchies for displaying on the horizontal axis and the other time hierarchy for generating trend lines 304 on the trend chart 302. The subsequently generated time-folded trend chart 302 may enable the user to compare the trend lines 304 of specific data criteria for multiple time periods over the same time period.

In another example embodiment, the system may enable a user to select multiple cells in the data summarization table for viewing multiple trend lines 304 at the same time in a trend chart in order to compare trends for each data set. The system may automatically determine a common time hierarchy for each selected active cell and may display trend lines 310 on the trend chart corresponding to each of the selected active cells. In another embodiment, the system may enable a user to compare a parent/child trend, in which the trend chart 302 may display multiple trend lines 304 for a category and subcategory, such as for example, sales in the United States (the parent) over a particular time period compared with sales in a particular state (the child) over the same time period.

Figure 4:
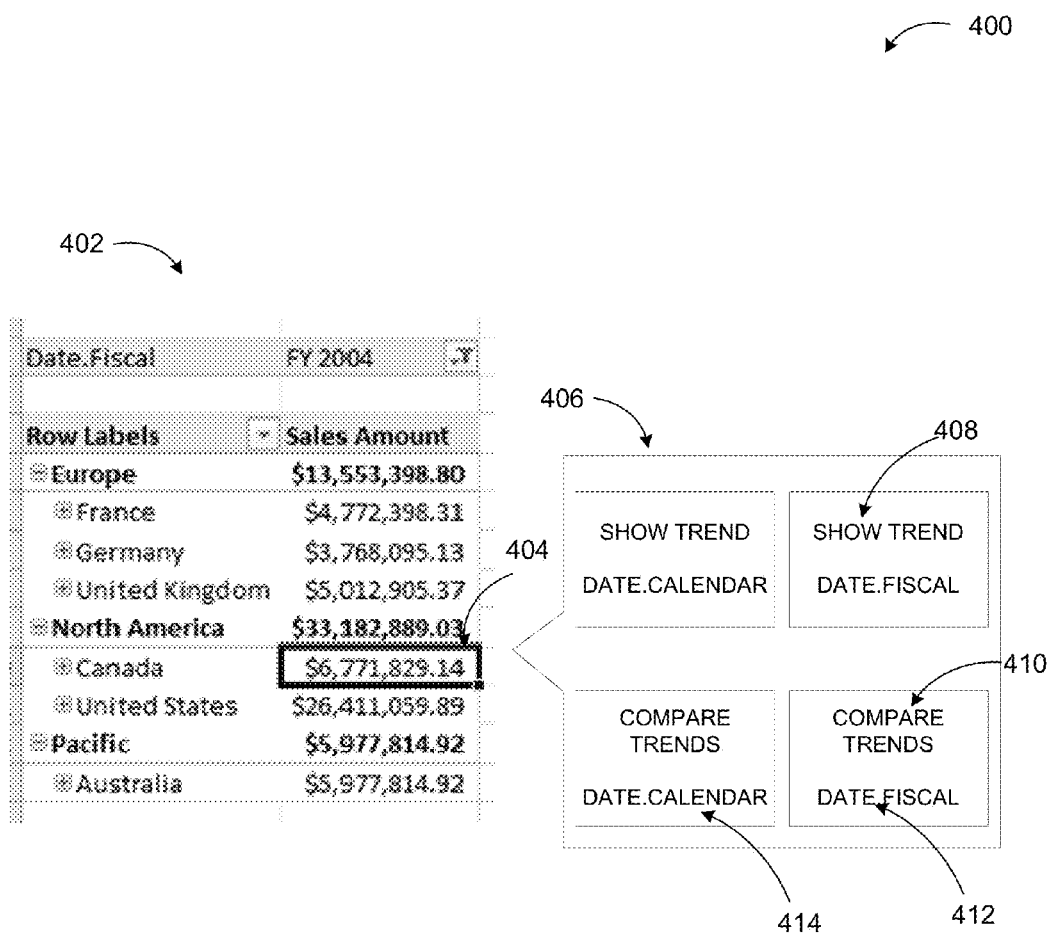
FIG. 4 illustrates an example screen shot of a trend suggestion dialog for displaying trend chart suggestions.

FIG. 4 illustrates an example screen shot of a trend suggestion dialog for displaying trend chart suggestions. As described above in conjunction with FIG. 1, trend analysis may be performed by automatically generating a trend chart upon selection of an active cell in a data summarization table. In a system according to embodiments, upon selection of the active cell 404 in the data summarization table 402, a dialog or a data visualization suggestion wizard 406 may be presented to the user in order to launch the trend chart. When the active cell 404 in the data summarization table 402 is selected, the data visualization suggestion wizard 406 may appear prompting the user to indicate the type and/or form of trend analysis the user wants to view.

In an example embodiment, the data visualization suggestion wizard 406 may suggest the time hierarchy 414 according to its automatic identification of the time hierarchy from the data source associated with the active cell 404. Additionally, the data visualization suggestion wizard 406 may suggest an alternative time hierarchy 412, enabling the user to select an alternative time hierarchy for automatically displaying on the automatically generated trend chart. The data visualization suggestion wizard 406 may further suggest a trend chart 408 based on selection of one active cell, and the data visualization suggestion wizard may also suggest a time-folded trend chart 410 for comparing multiple time periods for one active cell, or in the event multiple active cells have been selected, comparing trend lines for the multiple active cells.

The example systems in FIG. 1 through 4 have been described with specific configurations, applications, and interactions. Embodiments are not limited to systems according to these examples. A system for automatically generating a trend chart for performing trend analysis on a selected dataset may be implemented in configurations employing fewer or additional components and performing other tasks. Furthermore, specific protocols and/or interfaces may be implemented in a similar manner using the principles described herein.

Figure 5:
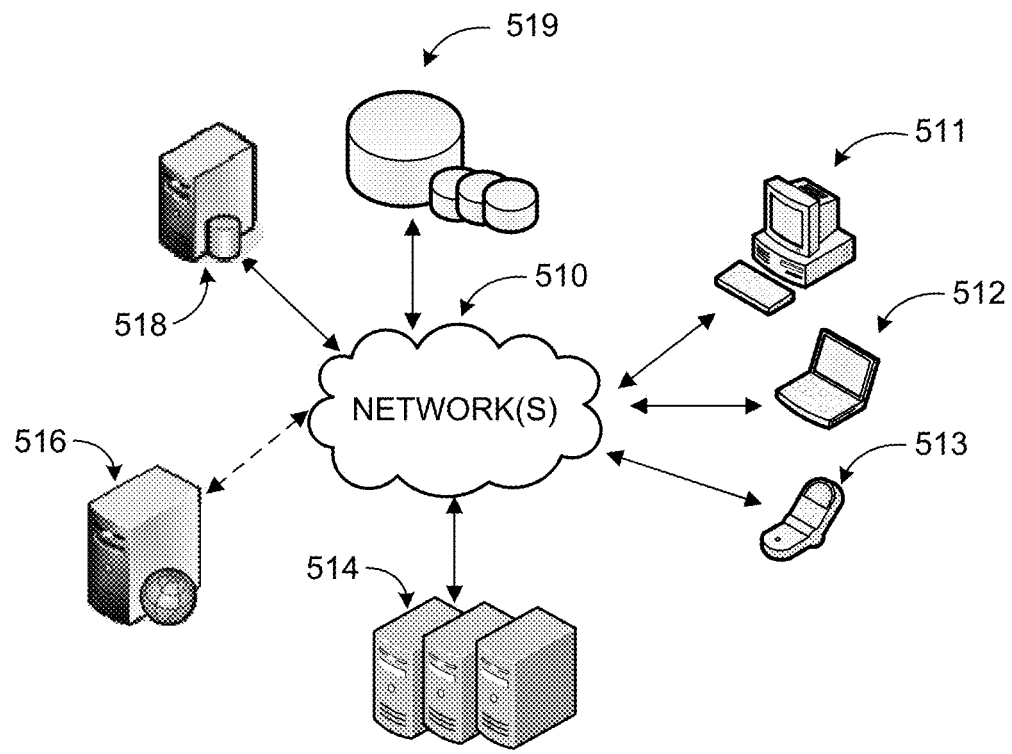
FIG. 5 is a networked environment, where a system according to embodiments may be implemented.

FIG. 5 is an example networked environment, where embodiments may be implemented. A system for automatically generating a trend chart for performing trend analysis on a selected dataset may be implemented via software executed over one or more servers 514 such as a hosted service. The platform may communicate with client applications on individual computing devices such as a smart phone 513, a laptop computer 512, or desktop computer 511 ('client devices') through network(s) 510.

Client applications executed on any of the client devices 511-513 may facilitate communications via application(s) executed by servers 514, or on individual server 516. An application executed on one of the servers may facilitate automatically detecting selection of an active cell in a data summarization table, identifying the metadata contained in a data source behind the selected active cell, and generating a trend chart for performing trend analysis on the selected active cell. The application may provide additional dialogs or wizards to a user for the selection of the parameters for the trend chart and displayed time hierarchies according to the user's custom preferences. The application may retrieve relevant data from data store(s) 519 directly or through database server 518, and provide requested services (e.g. document editing) to the user(s) through client devices 511-513.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to implement a platform for automatically generating a trend chart for performing trend analysis on a selected dataset. Furthermore, the networked environments discussed in FIG. 5 are for illustration purposes only. Embodiments are not limited to the example applications, modules, or processes.

Figure 6:
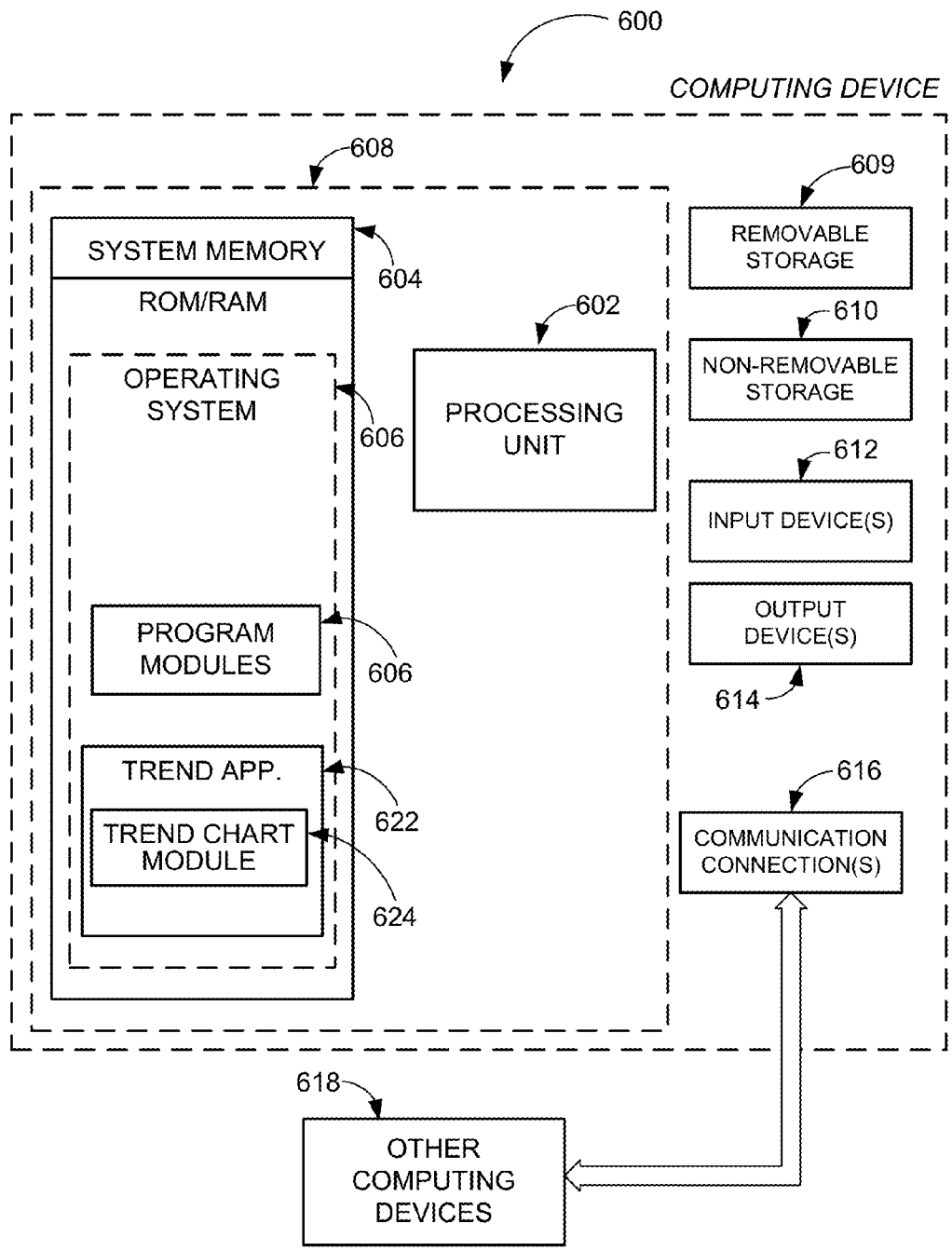
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be any computing device executing an application for automatically generating a trend chart for performing trend analysis on a selected dataset according to embodiments and include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 606 suitable for controlling the operation of the platform, such as the WINDOWS® operating systems from MICROSOFT CORPORATION of Redmond, Wash. The system memory 604 may also include one or more software applications such as program modules 606, trend application 622, and trend chart module 624.

Application 622 may enable computing device 600 to automatically detect selection of an active cell by a user in a data summarization table and automatically generate a trend chart for performing trend analysis on the selected active cell. Trend chart module 624 may facilitate identification of the metadata in a data source behind the selected active cell, and automatically determining the appropriate time hierarchy for displaying in the automatically generated time chart. Through a user interface trend application 622 may display a dialog to a user for the selection of the parameters for the trend chart and displayed time hierarchies according to the user's custom preferences. The application may enable a user to select preferences for the automatically generated trend chart, and after generation of the trend chart, may enable the user to further customize the trend chart. Trend application 622 and trend chart module 624 may be separate applications or integrated modules of a hosted service. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wired or wireless network in a distributed computing environment, a satellite link, a cellular link, a short range network, and comparable mechanisms. Other devices 618 may include computer device(s) that execute communication applications, web servers, and comparable devices. Communication connection(s) 616 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
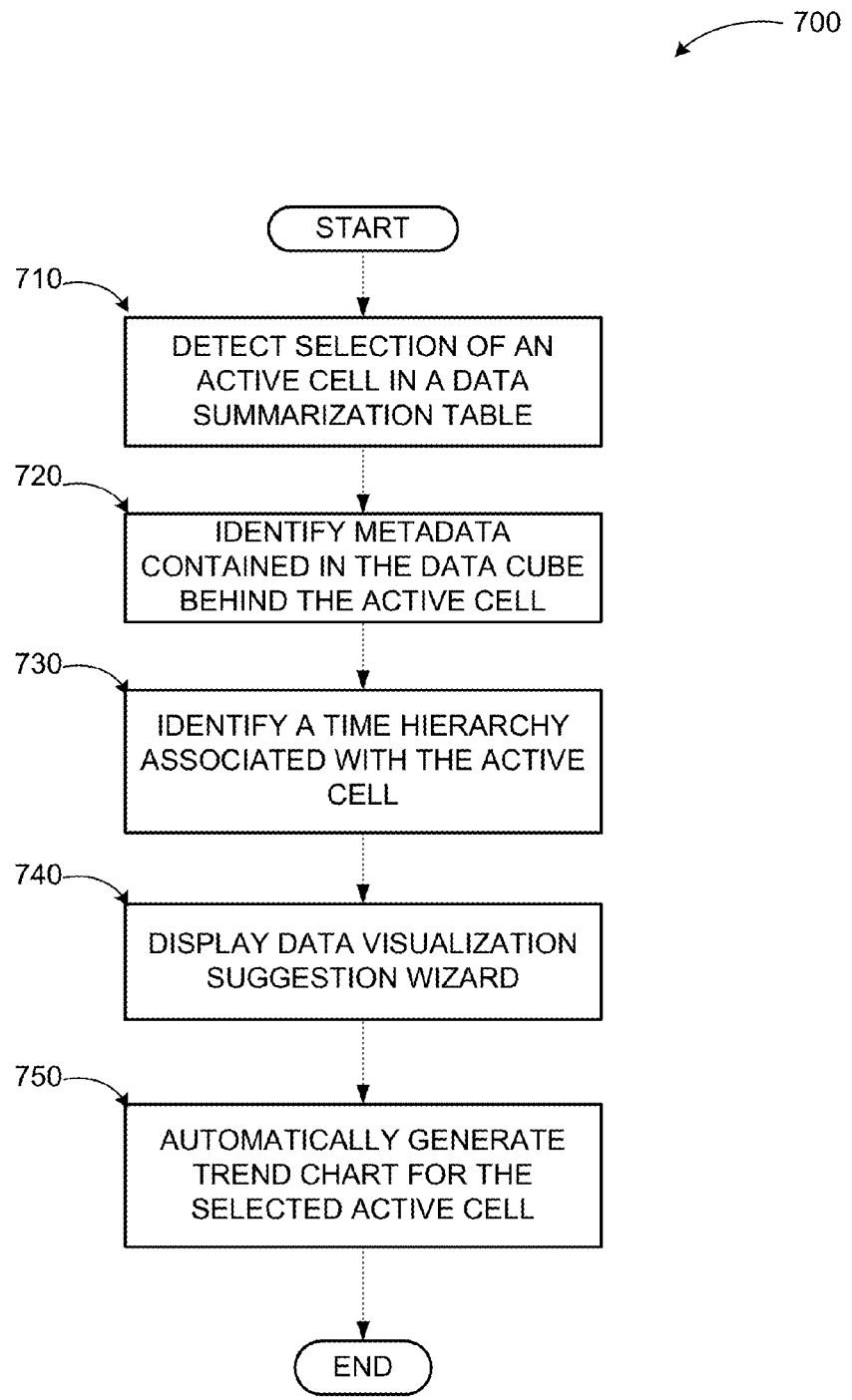
FIG. 7 illustrates a logic flow diagram for a process of automatically generating a trend chart for trend analysis of a data set according to embodiments.

FIG. 7 illustrates a logic flow diagram for process 700 of automatically generating a trend chart for performing trend analysis on a selected dataset according to embodiments. Process 700 may be implemented on a computing device or similar electronic device capable of executing instructions through a processor.

Process 700 begins with operation 710, where the system may detect that a user has selected a cell in a data summarization table. The system may determine if the cell supports trend analysis by determining if a time dimension (or similar dimension) is included in the data source for the cell. Upon selection of the cell, the system may identify the cell as an active cell for generating a trend chart. At operation 720, the system may identify the metadata in the multidimensional data source behind the active cell. The data source may include a time dimension, as well as other data attributes for the active cell. At operation 730, the system may identify a time hierarchy associated with the active cell. If the time hierarchy is displayed on the data summarization table, the displayed time hierarchy may be selected for display on the trend chart. If a time hierarchy is not displayed on the data summarization table, the system may identify time hierarchy data in the data source behind the selected active cell. The system may select the largest available time hierarchy in the data source for the active cell, provided the time hierarchy includes the minimum number of data points for generating a useful trend line.

At operation 740, the system may display a data visualization suggestion wizard for prompting the user to indicate the type and/or form of trend analysis the user wants to view. The data visualization suggestion wizard may suggest a time hierarchy for automatically displaying on the automatically generated trend chart. At operation 750, the system may launch the trend analysis and may automatically generate a trend chart for the selected active cell. The trend chart may display the identified time hierarchy on the horizontal axis and may display a selected measure of a data attribute for the active cell on the vertical axis. In example embodiments, the trend chart may display multiple trend lines for comparing trends of multiple data sets over the same time period.

The operations included in process 700 are for illustration purposes. Automatically generating a trend chart for performing trend analysis on a selected dataset may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed in a computing device to generate a trend chart to perform trend analysis on a selected dataset, the method comprising:
    detecting selected cells in a data representation;
    identifying the selected cells as active cells, wherein the selected active cells include a time period gap in response to a user selection of a noncontiguous time period in the data representation;
    filling the time period gap with data associated with the active cells;
    identifying metadata in a data source associated with the active cells without one or more from a set of: an input from a user and a configuration action from the user;
    identifying a time hierarchy associated with the active cells from the data source;
    identifying one or more data attributes included in the data source associated with the active cells;
    determining a time hierarchy level based on a number of data points of the one or more data attributes to generate trend lines, wherein the time hierarchy level includes at least three data points;
    generating the trend chart displaying the trend lines for the one or more data attributes in the selected active cells over an analogous time period based on the identified metadata and the time hierarchy, wherein a first trend line includes a category data set from the selected active cells and a second trend line includes a subcategory data set from the selected active cells; and
    enabling the user to select the active cells associated with a dimension in the data source.

2. The method of claim 1, wherein the data representation includes one of a table, a chart, a graph, a database representation, and a data summarization table.

3. The method of claim 1, further comprising:
    upon identifying the selected cells as the active cells, determining if the data in the active cells supports a trend analysis by determining if the data source includes a time dimension.

4. The method of claim 1, further comprising:
identifying a measure of the one or more data attributes displayed in the active cells; and
configuring the measure of the one or more data attributes displayed in the active cells as a vertical axis value of the trend chart.

5. The method of claim 1, wherein identifying the time hierarchy associated with the active cells further comprises:
identifying if the time hierarchy is displayed as a field in the data representation; and
configuring the time hierarchy displayed as the field in the data representation as a horizontal axis on the trend chart.

6. The method of claim 5, further comprising:
if the time hierarchy is not displayed as the field in the data representation, identifying the time hierarchy included within metadata in a data source associated with the active cells; and
configuring the time hierarchy from the metadata as the horizontal axis on the trend chart.

7. The method of claim 5, further comprising:
selecting a largest time hierarchy level included within metadata in a data source associated with the active cells for configuring as the horizontal axis on the trend chart.

8. The method of claim 5, further comprising:
selecting the time hierarchy for configuring as the horizontal axis on the trend chart based on a number of data points available for one or more data attributes of the active cells in the time hierarchy.

9. The method of claim 1, wherein generating the trend chart displaying the trend lines for the data in the selected active cells further comprises:
identifying two or more complementary time hierarchies associated with the active cells;
selecting one of the two or more complementary time hierarchies for configuring as a horizontal axis on the trend chart;
condensing the two or more complementary time hierarchies on the horizontal axis into a series of time periods;
selecting a remainder of the two or more time hierarchies for displaying as the trend lines on the trend chart; and
generating a time-folded trend chart displaying the remainder of the two or more time hierarchies as the trend lines for comparing trends on the trend chart.

10. The method of claim 1, further comprising:
enabling the user to select the active cells in the data representation; and
generating the trend chart displaying the trend lines corresponding with the selected active cells.

11. The method of claim 1, further comprising:
displaying a data visualization suggestion wizard for customization of the trend chart;
suggesting at least one from a set of: a type of the trend lines and a form of the trend lines to be displayed on the trend chart, the time hierarchy for configuring as a horizontal axis of the trend chart, and an alternative time hierarchy for configuring as the horizontal axis of the trend chart; and
upon receiving user selections, generating the trend chart according to the user selections.

12. The method of claim 11, further comprising:
identifying an intersection between a suggested time hierarchy and a suggested alternative time hierarchy suggesting the type of the trend lines and the form of the trend lines to be displayed on the trend chart; and
configuring the intersection as the time hierarchy to be displayed on the horizontal axis of the trend chart.

13. A computing device to generate a trend chart to perform trend analysis on a selected dataset, the computing device comprising:
a memory storing instructions;
a processor coupled to the memory, the processor executing an application to generate the trend chart, wherein the application is configured to:
detect selected cells in a data representation;
identify the selected cells as active cells, wherein the selected active cells include a time period gap in response to a user selection of a noncontiguous time period in the data representation;
fill the time period gap with data associated with the active cells;
identify metadata in a data source associated with the active cells without one or more from a set of: an input from a user and a configuration action from the user;
identify one or more data attributes included in the data source associated with the active cells;
identify a measure of the one or more data attributes displayed in the active cells;
configure the measure of the one or more data attributes as a vertical axis value on the trend chart;
identify a time hierarchy displayed as a field in the data representation;
determine a time hierarchy level based on a number of data points of the one or more data attributes to generate trend lines, wherein the time hierarchy level includes at least three data points;
configure the time hierarchy displayed as a field in the data representation as a horizontal axis on the trend chart;
generate the trend chart displaying the trend lines for the one or more data attributes in the active cells over an analogous time period, wherein a first trend line includes a category data set from the selected active cells and a second trend line includes a subcategory data set from the selected active cells; and
enable the user to select the active cells associated with a dimension in the data source.

14. The computing device of claim 13, wherein the trend chart is displayed on a same page as the data representation.

15. The computing device of claim 13, wherein the application is further configured to:
employ at least one from a set of rows, columns, filters, and slicers associated with the active cells in the data representation to determine appropriate fields and values to display in the trend chart.

16. The computing device of claim 13, wherein the application is further configured to:
identify a time-gap when the data is not available for a particular data point in the time hierarchy; and
fill in a gap in the trend lines on the trend chart with one of: a break in the trend lines, a zero value on the trend lines, and interpolated data.

17. The computing device of claim 13, wherein the application is further configured to:
enable the user to customize trend chart settings and axes settings subsequent to the generation of the trend chart.

18. A computer-readable memory device with instructions stored thereon to generate a trend chart to perform trend analysis on a selected dataset, the instructions comprising:
detecting one or more selected cells in a data representation;
identifying the one or more selected cells as active cells, wherein the one or more selected active cells include a time period gap in response to a user selection of a noncontiguous time period in the data representation;

filling the time period gap with data associated with the active cells;

identifying metadata in a data source associated with the active cells without one or more from a set of: an input from a user and a configuration action from the user;

identifying one or more data attributes included in the data source associated with the active cells;

identifying a measure of the one or more data attributes displayed in the active cells;

configuring the measure of the one or more data attributes displayed in the active cells as a vertical axis value on the trend chart;

identifying a time hierarchy associated with the active cells, wherein the time hierarchy is determined from one of: a field displayed in the data representation and the metadata contained in the data source associated with the active cells;

configuring the time hierarchy as a horizontal axis on the trend chart;

determining a time hierarchy level based on a number of data points in the one or more data attributes to generate trend lines, wherein the time hierarchy level includes at least three data points;

displaying a data visualization suggestion wizard associated with the active cells to receive user selections to customize the trend chart;

generating the trend chart displaying the trend lines associated with the one or more data attributes in the active cells over an analogous time period, wherein a first trend line includes a category data set from the selected active cells and a second trend line includes a subcategory data set from the selected active cells; and enabling the user to select the active cells associated with a dimension in the data source.

19. The computer-readable memory device of claim 18, wherein the trend chart is displayed on a separate page from the data representation.

20. The computer-readable memory device of claim 18, wherein the instructions further comprise:

enabling the user to select the active cells in the data representation;

identifying two or more common time hierarchies associated with the selected active cells; and generating the trend chart displaying the trend lines corresponding with the selected active cells, wherein the trend lines display at least one from a set of high points, low points, and a mean value.

* * * * *